May 25, 1926.

W. REGELEIN ET AL 1,586,004

OSCILLATION METER

Filed May 20, 1925    3 Sheets-Sheet 1

Witnesses:

Inventors:
Wilhelm Regelein
Arthur Glaubitz

May 25, 1926.

W. REGELEIN ET AL 1,586,004

OSCILLATION METER

Filed May 20, 1925    3 Sheets-Sheet 2

Inventors:
Wilhelm Regelein
Arthur Glaubitz

May 25, 1926.

W. REGELEIN ET AL

OSCILLATION METER

Filed May 20, 1925    3 Sheets-Sheet 3

1,586,004

Witnesses:
Joh. Mertens
H. Faber

Inventors:
Wilhelm Regelein
Arthur Glaubitz

Patented May 25, 1926.

1,586,004

UNITED STATES PATENT OFFICE.

WILHELM REGELEIN AND ARTHUR GLAUBITZ, OF MULHEIM-RUHR, GERMANY.

OSCILLATION METER.

Application filed May 20, 1925. Serial No. 31,687.

The development of almost all types of engines and machines in respect of their increasing circumferential speed makes the measurement of oscillations occurring in engine parts, foundations and the like, essential. Attempts have been made to provide apparatus for measuring the magnitude, number and direction of such oscillations, said apparatus being mostly based upon the employment of an inert mass like the known seismographs. Said known apparatus suffer from the drawback that the oscillating mass forms a fraction of the apparatus only, comparatively to the large mass of the casing of the same. Thereby, they are too cumbrous in their construction and mechanical arrangement and not sensitive enough, while those of great sensitiveness are non-useful for their practical application. Sometimes, they are too heavy and unhandy and can be used after careful preparation only.

The idea of the present invention is to create a handy and simple compact oscillation meter of sufficiently high sensitiveness and exactness and which can be easily used even by unskilled persons.

According to the invention, that part of the apparatus which directly takes-up the oscillations to be measured is rather larger and formed of a thin-wall casing of light mass within which the inert mass, that forms a substantial part of the whole apparatus, is freely suspended by springs, while between said casing and the inert mass a measuring apparatus is directly inserted, by which the oscillations are indicated and can be measured, and recorded, as to their magnitude, number and direction.

The improved oscillation meter thus constructed has the advantage of great simplicity, while by the omission of superfluous and complicated transmission mechanisms it shows a high exactness and sensitiveness, the degree of which can besides be regulated to suit requirements.

With the construction of the oscillation meter explained, the measuring apparatus inserted between the casing and the inert mass can be fixed either on the casing or on the inert mass; in both cases, a handy and compact oscillation meter of simplest construction is created. The latter becomes most advantageous if at the same time those parts of the apparatus, which take-up the oscillations to be measured and transmit the same to the measuring apparatus, are made of as little mass as possible, whereas the inert mass is made as heavy as possible for the purpose of increasing the sensitivenesss of the apparatus. To this end, according to the invention, the freely suspended inert mass serves directly as a support for the measuring apparatus, which indicates the oscillations of the casing with reference to the inert mass and records the same, the measuring apparatus being constructed like a measuring instrument or like a recorder.

The improved measuring apparatus can be so arranged that it is adapted in one and the same position to successively indicate and measure oscillations of different oscillation planes, for instance horizontal and perpendicular oscillations. For this purpose, the measuring apparatus inserted between the casing and the inert mass can be adjusted to a plurality of elements transmitting the oscillations of different oscillation planes to be measured. Furthermore, it is easily possible to so construct the improved measuring apparatus that it is adapted to directly indicate and measure the oscillations of any directions, as will be hereinafter explained.

The improved oscillation meter has the advantage that those parts taking-up the oscillations of the engine parts and transmitting the same to the measuring apparatus, can be made of simplest formation, thin-walled and pressed of light-metal or the like, whereby they are adapted to exactly follow trifling and speedy oscillations, so that the apparatus shows a high sensitiveness and exactness.

By unloading, as much as possible, those parts of the apparatus transmitting the oscillations to be measured to the measuring apparatus and by forming the latter, if desired with recording means, as part of the inert mass, the weight of the latter is favourably increased without increasing the dead weight of the apparatus. Or, the dead mass of the inert body, owing to its weight being increased by the measuring apparatus, can be kept correspondingly smaller, whereby a corresponding total reduction of weight of the apparatus is attained.

The connection between measuring apparatus, for instance a measuring instrument or a recorder, and oscillating casing is preferably created by contact-pins being in slight contact with the casing. Then, oscillations of any directions other than that of the contact pin axes can be transmitted to the measuring apparatus by means of levers fulcrumed on the inert mass and adapted to be adjusted to said contact pins. Even obliquely directed oscillations can be directly indicated and measured by making said contact-pins so turnable that their ends in any position thereof abut against a corresponding contact face. In this connection, it is also possible to make the whole measuring apparatus turnable together with said contact-pins. A particularly high usefulness of the improved oscillation meter can be attained by constructing the measuring apparatus as a measuring instrument that can also be used for the other purposes and making the same removable from the apparatus. With such arrangement, it is for instance possible to use existing measuring instruments or meters by inserting the same in the meter made without measuring apparatus. Furthermore, one and the same apparatus can be made of different sensitiveness by inserting therein correspondingly sensitive measuring instruments or meters.

A further advantage of the arrangement of the measuring apparatus or recorder on the inert mass consists in its being shock-freely mounted therein, so that the reading-off of its pointer deflections is facilitated and made more reliable, or its recording is made more exact, while at the same time faults produced by own oscillations of parts of the measuring apparatus or of the recorder are avoided.

The adjustment of the measuring apparatus to different oscillation planes can also be attained in a simple way by so arranging the same with reference to the inert mass that it can be fixed thereto in horizontal position for taking-up horizontal oscillations and in perpendicular position for taking-up perpendicular oscillations. Or, the measuring apparatus can be arranged that it is turnable in the body of the inert mass, whereby its contact-pins can be adjusted to any inclined positions. In this connection, care must be taken that the contact-pins are always in slight contact with the casing transmitting the oscillations, for which purpose they may be adjustable in their axial direction.

The springy suspension of the inert mass from the oscillating casing is effected by a series of fine springs, preferably active in different planes and forming draw or pressure-springs. By a regulation of the tension of said springs, the sensitiveness of the apparatus can be controlled to suit requirements. For attaining the same purpose, the springs can also be arranged easily detachable so that such of different tensions can be used. Said regulation of the spring tension allows further to use the apparatus in extraordinary positions, by counter-acting the compression of single springs produced by changes of load of the inert mass. This can also be effected by separate additional springs which in the normal positions of the apparatus do not act or which can be made to act according to requirements only.

The improved apparatus can also be so constructed that the determination and measuring of oscillations of any directions are possible in a particular simple way. For this purpose, those parts of the apparatus, for instance the contact-pins transmitting the oscillations of the casing to the measuring apparatus, are made turnable with reference to the inert mass or to the casing or to both of the latter, so that they can be made to contact with different contact faces of the casing. This construction can be easily attained, for instance with the employment of one of the known measuring instruments or meters, by turnably mounting the measuring apparatus on the inert mass, so that its contact-pins can be brought in contact with the different contact faces of the casing which preferably form one single cam race. The latter may be made of a circular section or of a spherical groove, according to the required amount of rotation of the contact-pins or of the measuring apparatus and according to the intended purpose of application.

If one contact-pin only is used for transmitting the oscillations of the casing to the measuring apparatus, with a positive movement of the parts of the latter, the contact faces can be so arranged that they positively guide the end of said contact-pin, which for this purpose is hook- or ball-shaped.

Particularly advantageous forms of construction of the improved apparatus can be attained by making the measuring apparatus with the cover of the casing carrying the contact faces turnable with reference to the casing and to the inert mass and fitting said cover with inner abutments for the contact-pins and said casing with inner projections or guide-jaws for the inert mass. By simply turning said cover, then, the measuring apparatus located in the interior of the apparatus can be turned, so that oscillations of different directions can be measured successively. If, with such an arrangement, the measurng apparatus is turnable on a horizontal axis, it is possible to determine and measure three-dimensionally any direction of oscillation; for, besides, the apparatus can still be turned upon its supporting base on a perpendicular axis.

Instead of a measuring apparatus indicating the oscillations by deflections of an ordinary pointer thereon, one may also be used that records the determined and measured oscillations, so that, besides the magnitude and direction of the oscillations, also their number can be recorded.

The improved oscillation meter is particularly adapted for use in connection with the desired testing of oscillations and their dependence upon certain known and unknown circumstances.

In the accompanying drawings, various constructional forms of the improved oscillation-meter are illustrated:

Fig 3 is a perpendicular section through another form, on the line 3—3 of Fig. 4, which is a plan view thereof with certain parts broken away, while

Figure 1:
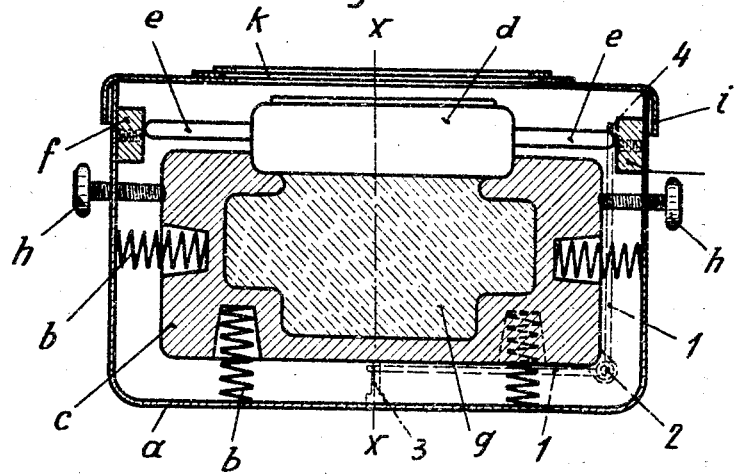
Figs. 1 and 2 are respectively a perpendicular central section through, and a plan view—with part of the cover broken away—of one form.
Figure 2:
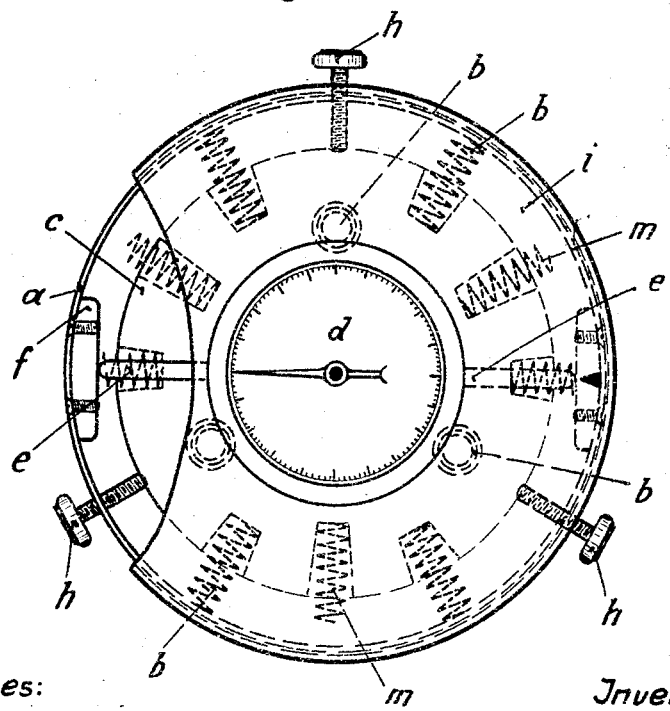

Referring to Figs. 1 and 2: In a thin-walled casing $a$ a heavy body $c$ of large mass is freely suspended by means of fine draw- or pressure-springs $b$. Said body forms the so-called inert mass of the apparatus and carries on its upper side a measuring apparatus $d$ of which the two diametrally opposite contact-pins $e$ are in slight contact with tempered and ground inner contact faces $f$ of the casing $a$. For increasing the weight of the inert mass, the body can be cast out with lead $g$. Whereas, then, the light casing $a$ with its contact faces $f$ follows the oscillations of the supporting base (machine, engine, or the like), upon which it is placed, the heavy body $c$ forming an inert freely suspended mass remains in its position of rest, as the oscillations of the casing are not transmitted thereto by the fine suspension-springs $b$. By the movements thus produced between the casing $a$ with its contact faces $f$ and the inert body $c$ with the measuring-work $d$ thereon, the magnitude of the oscillations taken-up by the casing can be read-off on a scale. The direction of the oscillations can be found by turning the whole meter about its perpendicular axis $x$—$x$ until the hand of the measuring apparatus shows its largest deflections. This will occur when the oppositely directed contact-pins $e$ lie in the plane of oscillation, the position of said pins in the casing $a$, which is preferably marked on the outside of the casing, indicating then the direction of oscillation.

The oscillation meter constructed as above described, allows of its being placed in an inclined position without impairing its exactness. Thus, it is not necessary to level the same with the aid of separate instruments.

By the employment of adjustable springs or of additional springs $m$, the oscillation meter can also be applied to perpendicular or inclined planes, of which the oscillations are to be measured. The casing $a$ can also be provided with different contact faces lying at a certain angle to each other.

If the apparatus is not in use, particularly during its transportation, the inert body $c$ is firmly fixed to the casing $a$ by means of set-screws $h$, the suspension-springs $b$ becoming thereby unloaded. The casing $a$ can be fitted with a protective cover $i$ having a glass insertion $k$.

It is understood that the measuring apparatus can also be wholly or partly attached to the casing and thus adapted to directly indicate the oscillations of the casing with reference to the inert mass, in which case the latter carries the contact faces $f$.

The improved oscillation meter can also be constructed in a simple way as an oscillation recorder, the parts of the apparatus required for this purpose being preferably arranged as parts of the inert mass.

Figure 3:
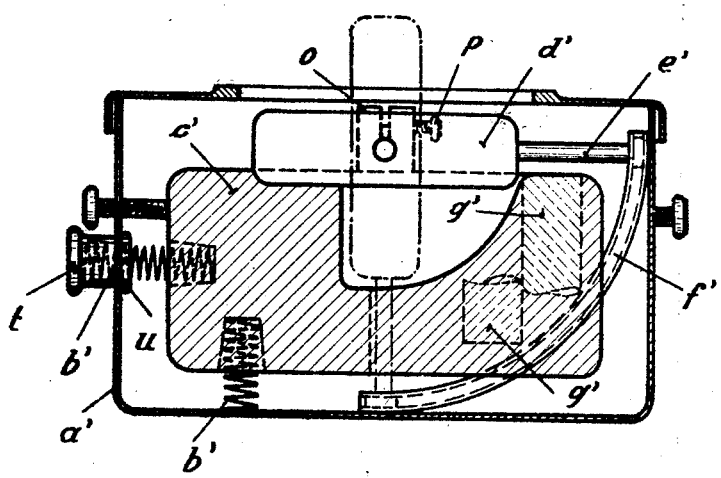
Figure 4:
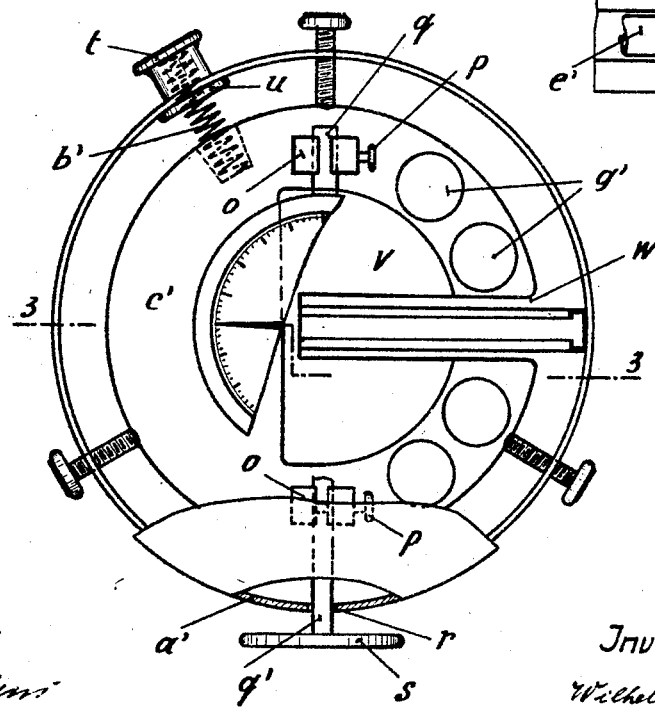
Figure 5:
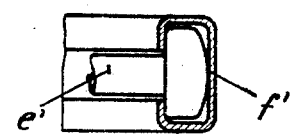
Fig. 5 shows a detail of Fig. 3 in a cross-section.

Referring to Figs. 3 to 5 inclusive: The arrangement of the measuring apparatus $d'$ is here turnable and its contact-pin $e'$ is in slight contact with a sector-like cam-race $f'$ integral with the casing $a'$. The measuring apparatus $d'$ is carried by the freely suspended inert mass $c'$ by means of slotted lugs $o$, in which the trunnions $q$, $q'$ of the measuring apparatus can be clamped-fast by screws $p$ in any position of said apparatus. One trunnion $q'$ of the measuring apparatus extends through a slot $r$ in the casing $a'$ to the outside of the latter and has there a handle $s$ by means of which the turning of the measuring apparatus can be easily effected.

The inert mass $c'$ is carried by springs $b'$, of which an appropriate number are provided within the casing $a'$, one spring only being shown in Figs. 3 and 4 for sake of clearness. To permit of said springs being easily exchanged, if required, outer caps $t$ having an easily disengageable joint $u$ of any appropriate kind with the casing $a'$ are provided. The inert mass $c'$ has appropriately designed recesses $v$ and $w$ allowing the measuring apparatus to turn from its horizontal to its perpendicular position or even beyond the latter.

Fig. 5 shows a cross-section through the cam-race $f'$, preferably of U-shaped section and inwardly bent at its free edges embracing the head-shaped end of the contact-pin $e'$, so that the latter is positively connected with the cam-race and thus with the casing $a'$, which takes-up the oscillations to be measured and transmits the same through the contact-pin to the measuring apparatus. The one-sided reduction of weight produced in the inert mass $c'$ can be balanced by the insertion of balance members $g'$, the centre of gravity of the inert mass maintaining thus its central position.

Figure 6:
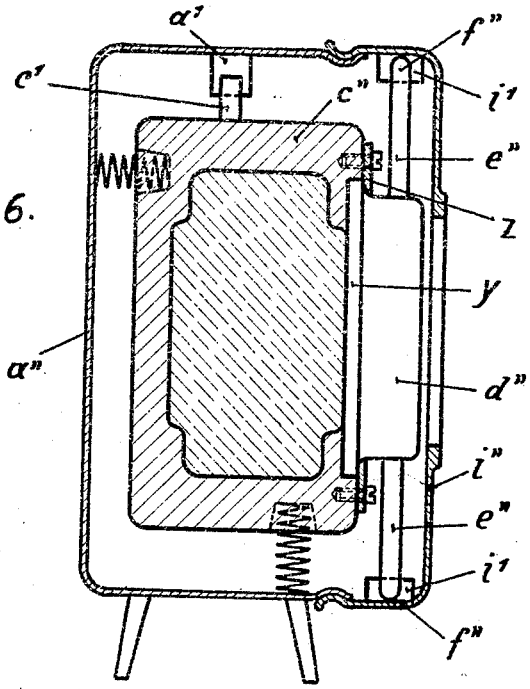
Figs. 6 and 7 are respectively a perpendicular central section through, and a front view of, a third form.
Figure 7:
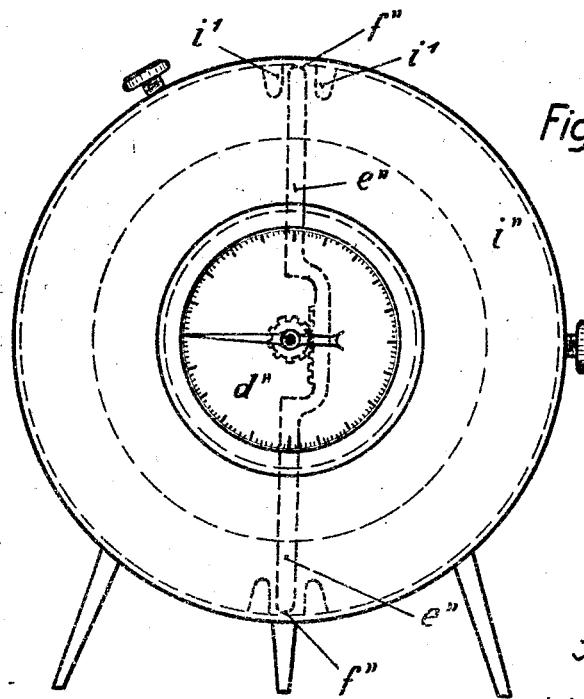

Referring to Figs. 6 and 7: The measuring apparatus $d''$ is arranged rotatably on the inert mass $c''$ by engaging with an integral collar $y$ beneath a ring $z$ screwed on said mass. The cover $i''$ of the casing is rotatable with reference to the latter and has inner abutments $i^1$ for the contact-pins $e''$ laterally of the contact faces $f''$ of the contact pins $e''$. By rotation of the cover $i''$ also the measuring apparatus $d''$ is rotated, so that the latter can be easily turned to any measuring direction. To prevent a turning of the inert mass when turning the cover, inner projections $a^1$ of the casing $a''$ are provided on both sides of a pin $c^1$ on the inert mass, which pin loosely engages between said projections without impeding the free movements of the casing.

Like the construction shown in Figs. 1 and 2, also those in Figs. 3 to 5 inclusive, and in Figs. 6 and 7, may be such that the oscillation meter can be used in horizontal as well as in perpendicular position of the casing.

With the above-described constructions of the improved oscillation meter, the determination, measuring and registering of existing oscillations generally takes place as follows: First, in the horizontal plane, by turning the meter on its supporting base, the direction is determined in which lies the maximum of the horizontal oscillation component. The measuring apparatus assumes then, for instance, the horizontal position shown in Fig. 3, or the oscillation meter shown in Fig. 6 is for this purpose placed in horizontal position, in which latter case also the turning of the oscillation meter on its supporting base can be omitted, as the desired determination can be made simply by rotating the cover $i''$. Thereupon, in the perpendicular plane laid through the found direction of the maximum horizontal oscillation component, the contact-pin is turned until the maximum of the oscillation deflections is determined. For this purpose, if required, the oscillation meter shown in Fig. 3 must once be turned on its perpendicular axis for 180° in case that the cam-race $f'$ extends over a quarter of a circular arc allowing to take measurement in one quadrant plane only. The direction of the maximum oscillations thus found indicates then under normal conditions the actual direction of the existing oscillations. The deflections of oscillation can then be measured and eventually registered by means of a recorder.

A modification indicated by dotted lines in Fig. 1 may still be referred to, according to which also oscillations of any directions other than that of the contact-pin axes can be measured by means of levers 1 fulcrumed to the inert mass $c$ and adapted to be adjusted to the contact-pins $e$. Such a lever 1 is rectangular and fulcrumed at its vertex to an integral lug 2 of the inert mass $c$. One of the horizontal arms of said lever projects beneath said inert mass to about the middle of the bottom of the casing $a$ and is at its end in loose connection therewith by means of an eye 3 of said bottom embracing the same. The other perpendicular arm of said lever extends to above and is adapted to engage with its end in a boring 4 of the contact-pin $e$.

The operation of said arrangement is as follows: In the position shown in Fig. 1, the contact-pins $e$ are in contact with the contact-faces $f$, so that at the occurrence of oscillations these can be measured in a horizontal plane. Perpendicular oscillations are not measured in this case, since the contact-faces $f$ can move in perpendicular directions without acting upon the contact-pins. If, however, the measuring apparatus $d$ is turned on its axis $x$—$x$ for about 90° until its contact-pin $e$ engages with the boring 4 therein over the upper end of the lever 1, the latter transmits also perpendicular oscillations of the bottom of the casing $a$ to the contact-pins $e$ and thus to the measuring apparatus $d$. In this case, horizontal oscillations are not measured, since the lower end of the lever 1 can freely move in the eye 3 in horizontal directions.

This arrangement permits thus of successively measuring horizontal and perpendicular oscillations with the aid of one and the same apparatus.

What we claim, is:

1. An oscillation meter, comprising in combination a light thin walled casing adapted to take up oscillations to be measured, a heavy body within said casing forming an inert mass which mass is a substantial part of that of the whole apparatus, fine suspension springs to freely suspend said body from said casing whereby the casing and body constitute relatively movable members, and a measuring apparatus carried by one of said members and having actuating means including contact pins engaging the other member whereby the apparatus is caused to give an indication proportional to the relative movement between said casing and body, substantially as and for the purpose set forth.

2. An oscillation meter as specified in claim 1, in which the measuring apparatus forms part of said inert mass, substantially as set forth.

3. In an oscillation meter as specified in claim 1, in which said measuring apparatus forms part of said inert mass, and its contact pins are in slight contact with the casing, substantially as set forth.

4. In an oscillation meter as specified in claim 1, said casing including a cover therefor there being contact faces on said cover, said cover together with said measuring apparatus being turnable with reference to the remainder of said casing and to said inert mass, the contact pins on said measuring apparatus being in slight contact with said contact faces, inner abutments on said cover for said contact pins, and inner projections on said casing arranged to prevent a turning of said inert mass when turning said cover, substantially as set forth.

5. In an oscillation meter as specified in claim 1, said measuring apparatus being turnable with reference to said inert mass so as to bring its contact pins to different oscillation planes, and means for effecting such adjustment, substantially as set forth.

6. An oscillation meter as specified in claim 1, in which different ones of said springs are active in different planes, substantially as set forth.

In testimony whereof we have hereunto set our hands.

WILHELM REGELEIN.
ARTHUR GLAUBITZ.